United States Patent
Parulski et al.

(10) Patent No.: US 7,755,662 B2
(45) Date of Patent: *Jul. 13, 2010

(54) DIGITAL CAMERA PROVIDING IMAGE PROCESSING FOR AN ATTACHABLE PRINTER

(75) Inventors: Kenneth A. Parulski, Rochester, NY (US); Jeffrey A. Small, Rochester, NY (US); Douglas W. Couwenhoven, Fairport, NY (US); Jason C. VanBlargan, Rochester, NY (US); Raymond E. Wess, Holley, NY (US)

(73) Assignee: Eastman Kodak Company, Rochester, NY (US)

( * ) Notice: Subject to any disclaimer, the term of this patent is extended or adjusted under 35 U.S.C. 154(b) by 427 days.

This patent is subject to a terminal disclaimer.

(21) Appl. No.: 11/680,682

(22) Filed: Mar. 1, 2007

(65) Prior Publication Data

US 2007/0139526 A1 Jun. 21, 2007

Related U.S. Application Data

(63) Continuation of application No. 09/800,158, filed on Mar. 6, 2001, now Pat. No. 7,212,229, which is a continuation-in-part of application No. 08/833,106, filed on Apr. 4, 1997, now Pat. No. 6,940,541.

(51) Int. Cl.
*H04N 5/225* (2006.01)
*H04N 1/60* (2006.01)
*B41J 3/00* (2006.01)
(52) U.S. Cl. .......................... 348/207.2; 358/1.9; 347/2
(58) Field of Classification Search ............. 348/207.2, 348/207.1, 207.11; 358/1.9, 518, 521, 2.1; 347/2
See application file for complete search history.

(56) References Cited

U.S. PATENT DOCUMENTS

| 4,161,749 | A | | 7/1979 | Erlichman |
| 4,642,678 | A | | 2/1987 | Cok |
| 4,774,574 | A | | 9/1988 | Daly et al. |
| 4,827,347 | A | | 5/1989 | Bell |
| 4,903,132 | A | * | 2/1990 | Yamawaki ............... 348/231.6 |

(Continued)

FOREIGN PATENT DOCUMENTS

EP 0 405 470 1/1991

(Continued)

*Primary Examiner*—John M Villecco
(74) *Attorney, Agent, or Firm*—Roland R Schindler; Eugene I. Shkurko

(57) ABSTRACT

A digital imaging system is provided that includes a digital camera and a color printer. The digital camera comprises: a housing; an image sensor adapted to capture analog image data; an analog-to-digital converter adapted to convert the analog image data; an image processor adapted to perform first processing and compression of the digital image data to create a first-processed digital image file; a digital memory in the camera housing having a plurality of the first-processed digital image files stored in the digital memory; and a color printer interface to which a digital image file, which is selected from the digital memory, is applied. The color printer comprises: a color-marking apparatus, and a digital camera interface, wherein the image processor in the digital camera is adapted to perform second processing on the selected digital image file before the selected digital image file is applied.

9 Claims, 6 Drawing Sheets

U.S. PATENT DOCUMENTS

| | | |
|---|---|---|
| 4,937,676 A | 6/1990 | Finelli et al. |
| 4,942,477 A | 7/1990 | Nakamura |
| 4,952,951 A | 8/1990 | Kumasaka et al. |
| 4,962,419 A | 10/1990 | Hibbard et al. |
| 5,040,068 A | 8/1991 | Parulski et al. |
| 5,138,459 A | 8/1992 | Roberts et al. |
| 5,189,511 A | 2/1993 | Parulski et al. |
| 5,237,401 A | 8/1993 | Koike et al. |
| RE34,654 E | 7/1994 | Yamawaki |
| 5,384,646 A | 1/1995 | Godshalk et al. |
| 5,398,305 A * | 3/1995 | Yawata et al. ............... 358/1.1 |
| 5,461,459 A | 10/1995 | Muramatsu |
| 5,488,223 A * | 1/1996 | Austin et al. ............... 235/375 |
| 5,563,655 A | 10/1996 | Lathrop |
| 5,652,621 A | 7/1997 | Adams, Jr. et al. |
| 5,668,596 A | 9/1997 | Vogel |
| 5,689,344 A | 11/1997 | Ebner |
| 5,717,839 A | 2/1998 | Ichikawa |
| 5,721,620 A | 2/1998 | Arai et al. |
| 5,754,184 A | 5/1998 | Ring et al. |
| 5,774,146 A * | 6/1998 | Mizutani ............... 347/43 |
| 5,781,315 A | 7/1998 | Yamaguchi |
| 5,812,243 A | 9/1998 | Waibel et al. |
| 6,108,001 A | 8/2000 | Tuttle |
| 6,268,931 B1 * | 7/2001 | Yamada et al. ............... 358/1.9 |
| 6,618,553 B1 | 9/2003 | Shiohara |
| 6,856,425 B2 | 2/2005 | Ozawa et al. |
| 6,952,222 B2 | 10/2005 | Sekine |
| 2002/0080250 A1 | 6/2002 | Ogawa et al. |
| 2004/0095469 A1 | 5/2004 | Lin |
| 2004/0165083 A1 | 8/2004 | Chang |
| 2004/0189811 A1 | 9/2004 | Ishiyama et al. |
| 2005/0190265 A1 | 9/2005 | Small |
| 2006/0109349 A1 | 5/2006 | Takashima |
| 2006/0221191 A1 | 10/2006 | Nonaka et al. |

FOREIGN PATENT DOCUMENTS

| | | |
|---|---|---|
| EP | 0 675 648 | 10/1995 |
| EP | 0 869 656 | 10/1998 |

* cited by examiner

DIGITAL CAMERA PROVIDING IMAGE PROCESSING FOR AN ATTACHABLE PRINTER

CROSS REFERENCE TO RELATED APPLICATIONS

This Application is a continuation of U.S. patent application Ser. No. 09/800,158, filed on Mar. 6, 2001, now issued as U.S. Pat. No. 7,212,229, which is a continuation-in-part of U.S. patent application Ser. No. 08/833,106, filed on Apr. 4, 1997, now issued as U.S. Pat. No. 6,940,541.

FIELD OF THE INVENTION

The present invention relates to digital cameras and associated printers for producing hardcopy images captured by such cameras.

BACKGROUND OF THE INVENTION

Typically, images captured by digital cameras must be processed before they are printed. This processing is carried out in the printer. Significant computing and memory resources are required to process an image for printing. Accordingly, the printer must be provided with expensive computing and memory resources. One solution known in the prior art is to provide access to a stand-alone computer that is connectable to both the camera and the printer, either directly or by portable memory. This solution is inappropriate when the printer is to be used in remote locations distanced from the computer.

SUMMARY OF THE INVENTION

According to a feature of the present invention, we have come to appreciate that computing and memory resources, which already exist in electronic cameras in order for the camera to capture, process, compress, and store images, can be used to provide the computing and memory resources that are required to process an image for printing, particularly for printing on a portable, low cost ink jet printer.

It is an object of the present invention to provide a system wherein already-existing computing and memory resources in an electronic camera are used to process an image for printing. This is possible because the existing computing and memory resources are otherwise generally idle during the printing stage. Accordingly, it is a feature of the present invention that, rather than duplicating, in printers, computing and memory resources that are already in digital cameras, the present invention provides for camera and printer systems wherein significant computing and memory resources need exist only in the camera. Because such resources are already required by the camera in order to perform the camera functions, the cost of the camera is not increased. Because the resources are no longer required in the printer, the overall system cost is greatly reduced.

It is another object of the present invention to provide a digital camera that can support many different printers, each with its own set of parameters such as, for example, print size, pixel size, colorimetry, sensitometry, and artifacts compensation. Accordingly, it is a feature of the present invention to provide for uploading print drivers and printer parameters to the camera to provide a basis for image processing specific to an associated printer; whereby compensation may be done for variations in the printer characteristics which may occur as a result of printer manufacturing variations, and further so that compensation may be done for different media types which may be installed in the printer, in particular different types of ink jet media installed in an ink jet printer.

According to another feature of the present invention, a digital imaging system is provided that includes a digital camera and a color printer. The digital camera comprises: a housing; an image sensor adapted to capture analog image data; an analog-to-digital converter adapted to convert the analog image data captured by the image sensor to digital image data; an image processor adapted to perform first processing and compression of the digital image data to create a first-processed digital image file; digital memory in the camera housing, a plurality of first-processed digital image files from the image processor being stored in the digital memory; and a color printer interface to which a digital image file, which is selected from the digital memory, is applied. The color printer comprises: a color marking apparatus, and a digital camera interface, wherein the image processor in the digital camera is adapted to perform second processing on the selected digital image file before the selected digital image file is applied to the color printer interface.

According to a preferred embodiment of the present invention, color records of the user-selected digital image file are converted to multi-tone values during the second processing.

According to another preferred embodiment of the present invention, color records of the user-selected digital image file are processed during the second processing to provide ink limiting. The ink limiting is effected using type of printer, ink, and receiver media information provided by the separate color printer over the interface.

According to another preferred embodiment of the present invention, the separate color printer uses four ink colors, and the color records of the user-selected digital image file are converted to three image planes and are color corrected during said second processing to provide a set of color planes corresponding to each ink color of the separate color printer.

According to another preferred embodiment of the present invention, a color image display provides user-observable images of first-processed digital image files stored in the removable digital memory. User controls are coupled to the processor for user-selecting a digital image file to be second processed by the image processor.

According to another preferred embodiment of the present invention, the first processing includes: interpolation to provide red, green and blue image data values to provide red, green, and blue color planes; color correction of the red, green, and blue color planes; and image compression. The second processing includes decompression of the user-selected digital image file before the user-selected digital image file is applied to the interface.

The invention, and its objects and advantages, will become more apparent in the detailed description of the preferred embodiments presented below.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
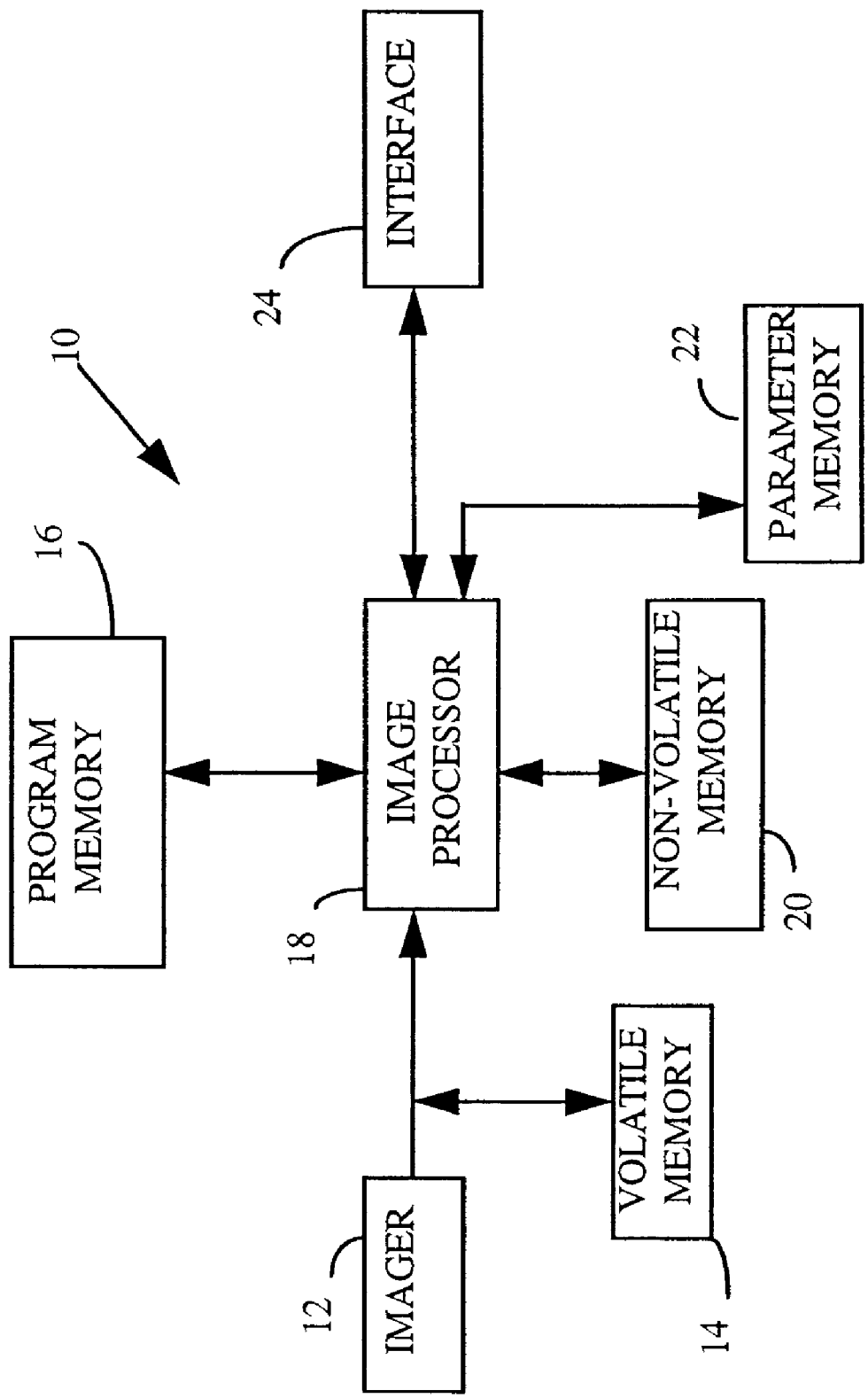
FIG. 1 is a schematic block diagram of a digital camera according to the present invention.

Referring to FIG. 1, a digital camera 10 provides significant image processing and memory resources to capture, process, compress, and store images. An imager 12 includes an array of image sensors such as, for example, light sensitive photoelements. Conventionally, a complete image frame is available in digital form from imager 12, only for a short time interval. Thus, the captured image is temporarily stored in raw form in a volatile memory 14. Various image processing algorithms are stored in a program memory 16, and are executed by an image processor 18 in order to process the image data stored in volatile memory 14. For example, the image processing algorithms may include all or some of the processes of image sensor tone scale compensation, color filter array interpolation, color space transformation, re-sizing, spatial filtering, and compression, as will be described in greater detail later in reference to FIG. 5. The resulting processed image data is then typically stored in a nonvolatile memory 20.

This stored image must be further processed prior to printing. Such further processing may include some or all of the steps of decompression, color space transformation into color planes that coincide with the process colors of the particular printer, re-sizing, rotation, and compensation for the printing process, as will be described in greater detail later in reference to FIG. 6. In prior art systems, this further processing has been effected by computing and memory resources in the printer or in a stand-alone computer. According to the present invention, this further processing is performed using the resources which are already in camera 10. It is advantageous to perform all of the processing using the resources in camera 10 in order to avoid the additional expense of including similar resources in the printer. To effect such image processing in camera 10, the camera is provided with a parameter memory 22 and a printer interface 24, both to be further described hereinafter.

Figure 2:
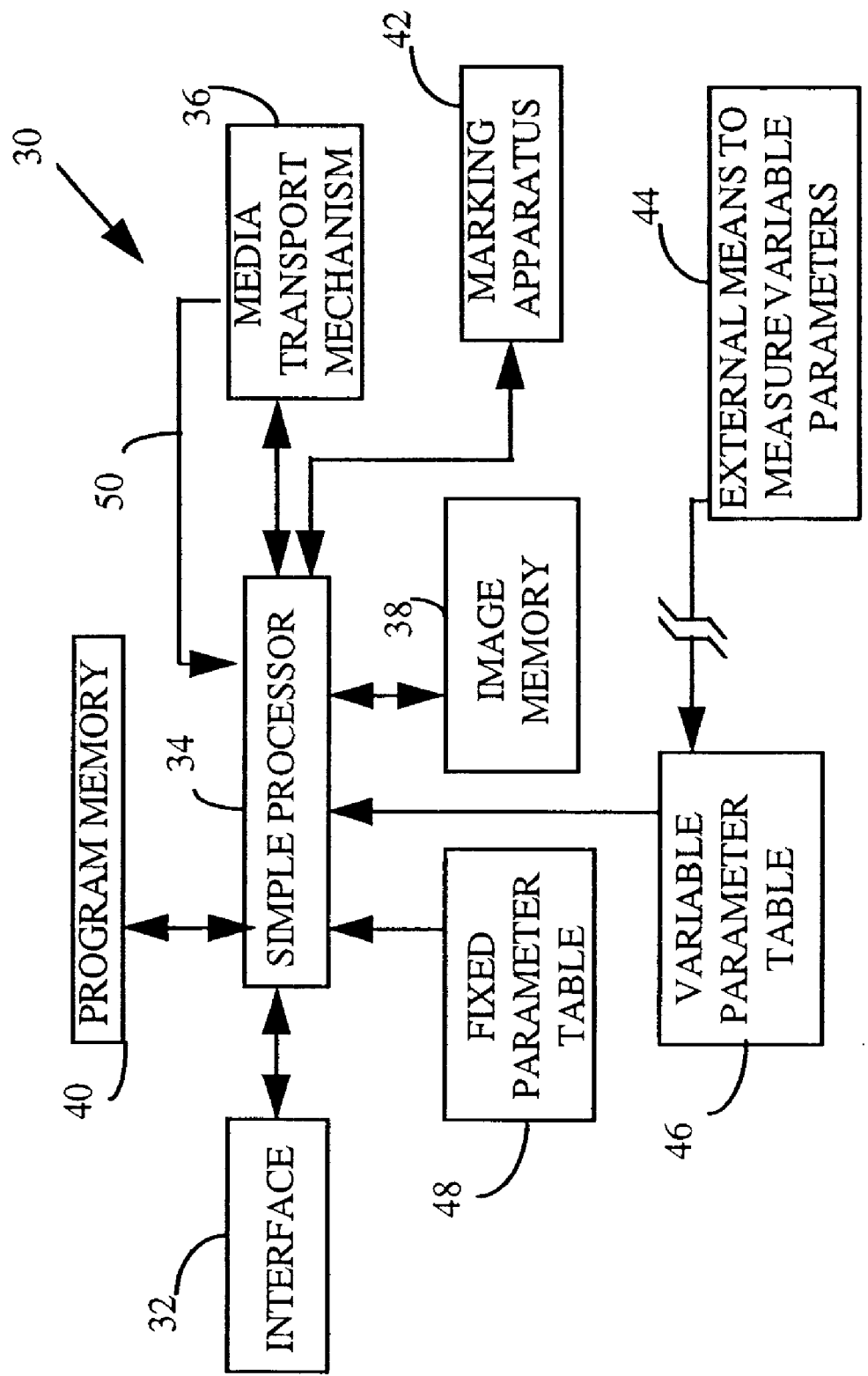
FIG. 2 is a schematic block diagram of a digital printer according to the present invention.

Referring to FIG. 2, a printer 30 includes a camera interface 32, an inexpensive simple processor 34, a media transport mechanism 36, an image memory 38, a program memory 40, and a marking apparatus 42. A processed image, received from camera 10 of FIG. 1 via interface 32, may be stored by printer 30 in image memory 38 for subsequent printing by marking means 42 under the control of simple processor 34 and a program stored in program memory 40, or the processed image may be printed immediately. Simple processor 34 need not be capable of executing printer compensation algorithms.

Parameters, which may vary as a result of manufacturing variations in the printer, may be measured by an external means 44 at the time of manufacture. The parameters may then be stored in a variable parameter table 46, which is part of the printer. Camera 10 may query printer 30 to establish whether the printer will perform compensation for the variable parameters, or whether the camera should request and accept the variable parameters from the printer, and subsequently perform compensation for said variable parameters. The printer provides both fixed parameters from a fixed parameter table 48 and variable parameters from its variable parameter table 46 to the camera by means of camera and printer interfaces 24 and 32, respectively. The camera stores these parameters in local parameter memory 22.

When an image in either volatile memory 14 or nonvolatile memory 20 is selected for printing, image processor 18 processes the selected image, using the fixed and variable parameters which are stored in parameter memory 22, and transmits the processed image to the printer by means of interfaces 24 and 32. Processing may include all or part of the operations of image sensor tone scale compensation, color filter array interpolation, decompression, color space transformation, re-sizing, rotation, cropping, spatial filtering, and compensation for the printing process, but is not limited to these specific operations.

In addition, parameters which can vary during printing may also be transmitted by the printer to the camera during the printing process and used by image processor 18 to further compensate the image for printing process variations during the printing operation. The parameters may include temperature, ink viscosity, measured density, and any other parameters which are known to vary with the specific printing process employed by the printer.

Further, parameters characteristic of particular media material at media transport mechanism 36 may be determined by simple processor 34 over an interface 50 and transmitted to the camera. The media parameters may include parameters which vary with media type and parameters which vary between different batches of media due to manufacturing variations. Thus, compensation for the media parameters may be done by image processor 18 in the camera.

Figure 3:
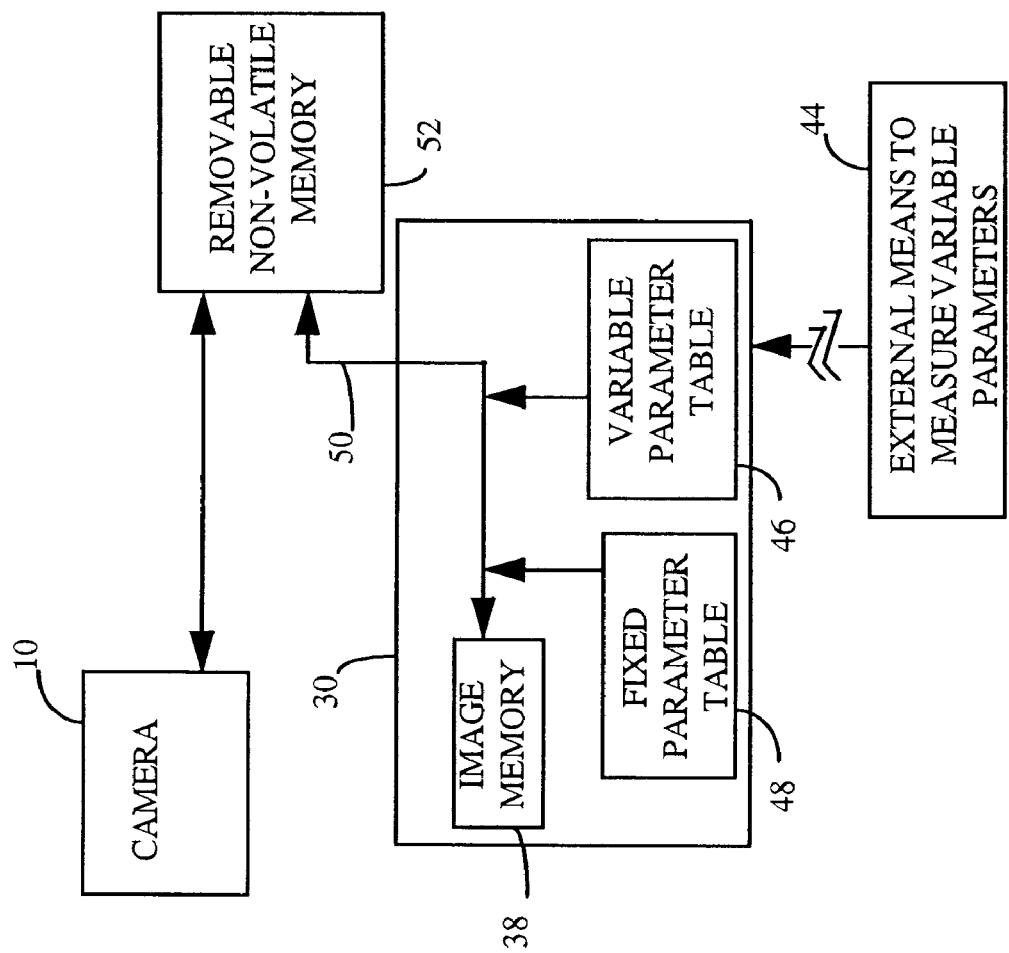
FIG. 3 is a schematic block diagram of a camera-printer system according to another embodiment of the present invention.

Any such media parameters, fixed parameters, and variable parameters may be transferred from printer 30 to camera 10 by means of a removable non-volatile memory cartridge 52 shown in FIG. 3. The memory cartridge may also be used to transfer images between the camera and the printer. As used herein, the phrases "camera interface and printer interface" are intended to include cable connections, transferable memory, radiation transmission (light, microwave, infrared, etc.), and other forms of information transfer between components.

Figure 4:
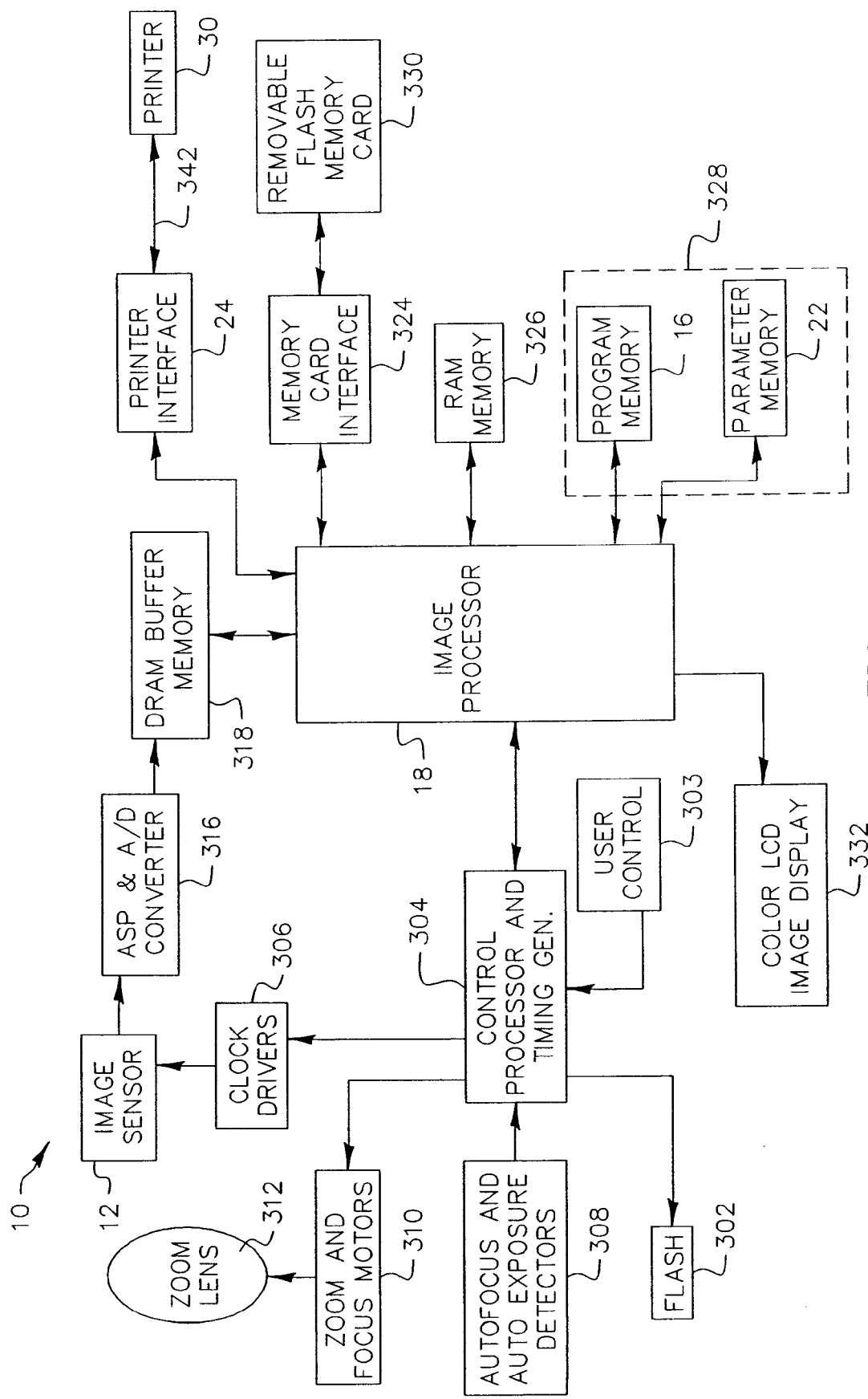
FIG. 4 is a detailed block diagram of a digital camera according to the present invention.

FIG. 4 is a block diagram showing portable digital camera 10 depicted in more detail than was shown in FIG. 1. Digital camera 10 stores images on a removable flash memory card 330, which is a specific type of non-volatile memory 14 (shown in FIG. 1). Digital camera 10 includes a zoom lens 312 having zoom and focus motor drives 310 and an adjustable aperture and shutter (not shown). Zoom lens 312 focuses light from a scene (not shown) on image sensor 12. Image sensor 12 may be, for example, a single-chip color CCD image sensor, such as a Toshiba model TCD5603D CCD sensor, available from Toshiba America Electronic Components, Irvine, Calif., U.S.A. The model TCD5603D sensor has approximately 1536 columns and 1024 rows of photoelements, and uses the well-known Bayer color filter pattern. Other CCD or CMOS image sensors, having various image array sizes and color filter patterns, may alternatively be used.

Image sensor 12 is controlled by clock drivers 306. Zoom and focus motors 310 and clock drivers 306 are controlled by control signals supplied by a control processor and timing generator circuit 304. The control processor and timing generator 304 receives inputs from autofocus and autoexposure detectors 308 and controls a flash 302. The analog output signal from image sensor 12 is amplified and converted to digital data by the analog signal processing (ASP) and analog-to-digital (A/D) converter circuit 316. The A/D converter may alternatively be included a part of image sensor 12, particularly if a CMOS image sensor is used. The digital data is stored in a DRAM buffer memory 318, which is a specific type of volatile memory 14 (shown in FIG. 1). The digital image data stored in DRAM buffer memory 318 is subsequently processed by a processor 18 controlled by the firmware stored in program memory 16, which can be provided by a flash EPROM memory 328. Flash EPROM memory 328 can be a single memory chip which can also provide parameter memory 22.

The processed digital image file is provided to a memory card interface 324 which stores the digital image file on removable memory card 330. Removable memory cards are known to those skilled in the art. For example, removable memory card 330 may be adapted to the Compact Flash interface standard, such as described in the CompactFlash Specification Version 1.3, published Aug. 5, 1998 by the CompactFlash Association, Palo Alto, Calif., U.S.A. Alternatively, removable memory card 330 can be adapted to the PCMCIA card interface standard, as described in the PC Card Standard, Release 2.0, published September 1991 by the Personal Computer Memory Card International Association, Sunnyvale, Calif., U.S.A. Removable memory card 330 can also be adapted to the well known secure digital (SD), solid state floppy disk card (SSFDC) or Memory Stick formats. Other types of non-volatile digital memory devices, such as magnetic hard drives, magnetic tape, or optical disks, could alternatively be used to store the digital images.

Processor 18 performs color interpolation followed by color and tone correction, in order to produce rendered sRGB image data as defined in IEC 61966-2-1 Multimedia systems and equipment—Color measurement and management—Part 2-1: Color management—Default RGB color space—sRGB available from the International Electrotechnical Commission, Geneva, Switzerland. The rendered sRGB image data is then JPEG compressed and stored as a JPEG image file on removable memory card 330 using an JPEG/Exif version 2.1 image file as defined in Digital Still Camera Image File Format Standard (Exchangeable Image File Format for Digital Still Camera: Exif), version 2.1, JEIDA-49-1998 available from the Japan Electronic Industry Development Association, Tokyo, Japan. The JPEG/Exif image files can be utilized by many different image capable devices, such as computers and imaging kiosks.

Processor 18 also creates a "thumbnail" size image that is stored in RAM memory 326 and supplied to color LCD image display 332, which displays the captured image for the user to review. Electronic camera 300 is controlled by user controls 303, such as a series of user buttons including a shutter release (e.g., capture button) (not shown) which initiates a picture taking operation. The graphical user interface displayed on color LCD image display 332 is controlled by the user interface portion of the firmware stored in program memory 16. The graphical user interface is also used to select images for printing, and can optionally be used to select the number of copies and the print layout (e.g. the number images printed on one page). The images selected for printing may be immediately printed, if digital camera 10 is connected to printer 30. If not, image processor 18 creates an "image utilization" file listing the image to be printed, the number copies for each image, and the print size, as described in commonly assigned U.S. patent application Ser. No. 08/977,382, filed by Parulski on Nov. 24, 1997, the disclosure of which is herein incorporated by reference. This "image utilization" file, which can conform to the well-known digital print order format (DPOF) is stored on removable flash memory card 330 along with the digital images captured by digital camera 10.

Figure 5:
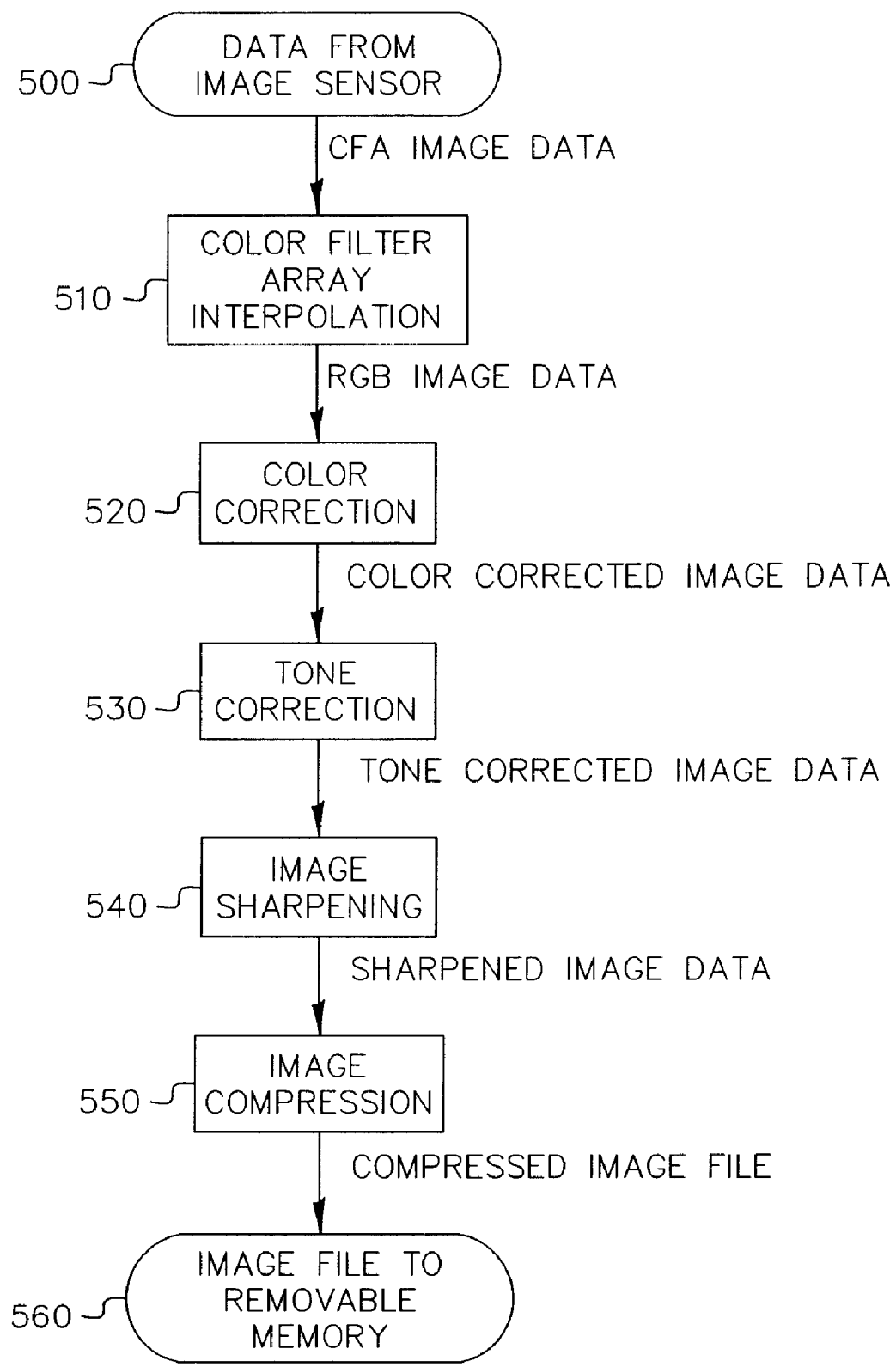
FIG. 5 is a flow diagram depicting the camera-related image processing operations provided by the digital camera of FIG. 3 in the process of capturing and storing images.

FIG. 5 is a flow diagram depicting the image processing operations that are performed by image processor 18 in digital camera 10 in order to process the images from image sensor 12 stored in DRAM buffer memory 318.

The Bayer pattern color filter array data (block 500) which has been digitally converted by A/D converter 16 is interpolated in block 510 to provide red, green and blue (RGB) image data values at each pixel location in order to provide complete RGB color planes. Color filter array interpolation in block 510 can use the luminance CFA interpolation method described in commonly assigned U.S. Pat. No. 5,652,621, entitled "Adaptive color plane interpolation in single sensor color electronic camera" to Adams et al., the disclosure of which is herein incorporated by reference. The color filter array interpolation in block 510 can also use the chrominance CFA interpolation method described in commonly assigned U.S. Pat. No. 4,642,678, entitled "Signal processing method and apparatus for producing interpolated chrominance values in a sampled color image signal", to Cok, the disclosure of which is herein incorporated by reference.

A color space transformation is applied to the interpolated RGB color planes in order to provide color correction, prior to image storage. The RGB color planes are color corrected in block 520 using, for example, the 3×3 linear space color correction matrix 20 depicted in FIG. 4 of commonly assigned U.S. Pat. No. 5,189,511, entitled "Method and apparatus for improving the color rendition of hardcopy images from electronic cameras" to Parulski et al., the disclosure of which is incorporated herein by reference. The color correction matrix coefficients which are stored in program memory 16 in digital camera 10 can be, for example:

Rout=1.50 Rin−0.30 Gin−0.20 Bin

Gout=−0.40 Rin+1.80 Gin−0.40 Bin

Bout=−0.20 Rin−0.20 Gin+1.40 Bin

The color corrected color planes are tone corrected in block 530. This tone correction 530 can use, for example, the lookup table corresponding to FIG. 2 of U.S. Pat. No. 5,189,511 cited above. This lookup table is stored in program memory 16 in digital camera 10. Alternatively, color correction image processing operations 520 and tone correction image processing operations 530 can be provided by a three-dimensional lookup table (3D LUT). An example of such a 3D LUT is described in commonly assigned U.S. patent application Ser. No. 09/540,807 filed Mar. 31, 2000 in the names of Geoffrey Woo et al., the disclosure of which is incorporated herein by reference. The 3D LUT is more complex than the 3×3 matrix and single-channel LUT approach described above. However, it allows better control of color saturation. For example, it allows increased color saturation for most memory colors without increasing the saturation of flesh tone colors and near-neutral colors.

The image sharpening provided in block 540 of FIG. 5 can utilize the method described in commonly assigned U.S. Pat. No. 4,962,419 ('419 patent), entitled "Detail processing method and apparatus providing uniform processing of horizontal and vertical detail components" to Hibbard et al., the disclosure of which is incorporated herein by reference.

Figure 6:
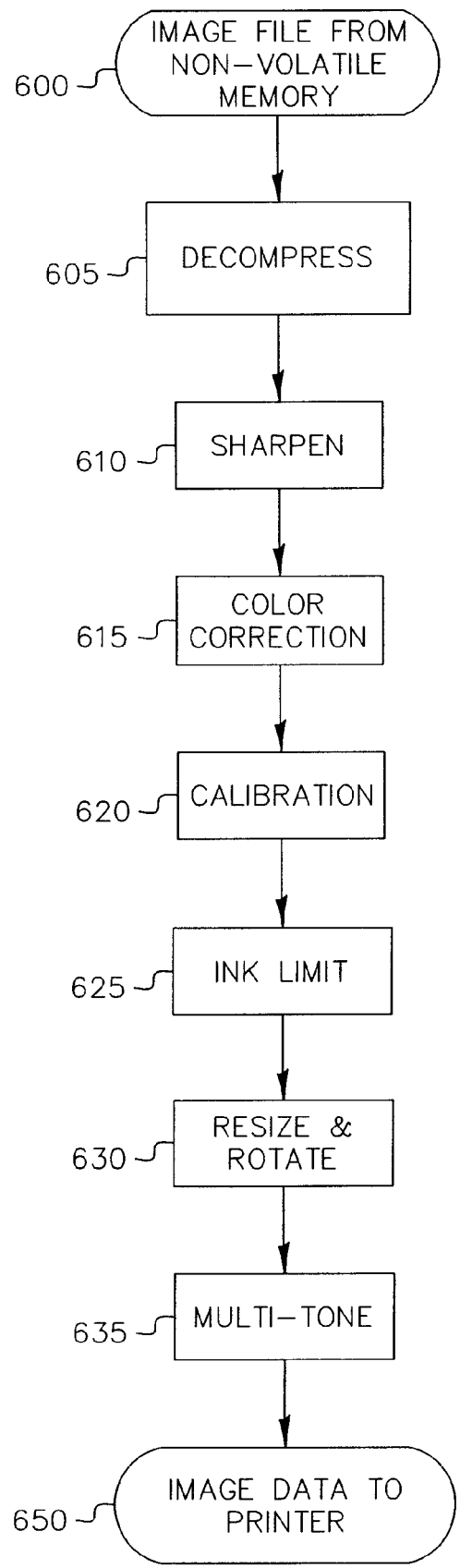
FIG. 6 is a flow diagram depicting the printer-related image processing provided by the digital camera of FIG. 3 in the process of reading and printing images.

The image compression provided in block 550 of FIG. 6 can use the method described in commonly assigned U.S. Pat. No. 4,774,574 (the '574 patent), entitled "Adaptive block transform image coding method and apparatus" to Daly et al., the disclosure of which is incorporated herein by reference.

The compressed image files are stored on removable flash memory card 330 as Exif image files. After a series of images have been taken and stored on removable memory card 330, removable memory card 330 can optionally be inserted into a memory card reader in the user's host computer (not shown) in order to transfer the images captured by the digital camera to the host computer, where they can be viewed, e-mailed via the Internet, etc. To print images without using a host computer, an interface cable 342 can be used to connect between printer interface 24 in digital camera 10 and the corresponding camera interface in digital printer 30. Printer interface 24 may conform to, for example, the well-know universal serial bus (USB) interface specification. Alternatively, printer interface 24 may conform to the RS-232 interface specification, the IEEE 1394 (Firewire) interface specification, or other cable interface specifications. Alternatively, the interface may utilize a wireless interface such as the well-known IrDA (Infrared Data Association) interface or an RF (radio frequency) interface such as the well-known Bluetooth RF interface.

FIG. 6 is a flow diagram depicting the printer-related image processing provided by image processor 18 in digital camera 10 in the process of reading and printing images on an ink jet printer. The images to be printed are selected by the user as described earlier. In block 600, the image file to be printed is retrieved from non-volatile memory 20 in FIG. 1, such as removable flash memory card 330 in FIG. 4. If digital camera 10 compressed images prior to storage, for example by creating the JPEG/Exif image files described earlier, the image file is decompressed in block 605 to provide red, green and blue (RGB) color planes. In block 610, each decompressed RGB color plane is sharpened in order to compensate for the sharpness degradation of the ink jet printing process. A preferred sharpening algorithm uses the well-known unsharp masking technique to produce a sharpened color plane Xs by creating a blurred version Xb of the original decompressed color plane Xo, and then computing:

$$Xs = 1 + k(Xo - Xb)$$

where X is each of the R, G, and B color planes, and k is a gain factor. Gain factor k can be a parameter stored in fixed parameter table 48 in printer 30 for all printers of a given model, or alternately in variable parameter table 46 for a particular printer, which is measured for each batch of printers as they are manufactured. The gain factor is provided from printer 30 to digital camera 10 by means of camera and printer interfaces 24 and 32 respectively, when printer 30 is connected to camera 10. The camera stores the gain factor k in camera parameter memory 22.

The sharpened RGB color planes are color corrected in block 615. The color correction block preferably uses a 3D LUT. The input to the 3D LUT is the RGB color plane, and the output is, for example, cyan, magenta, yellow, and black (CMYK) color planes corresponding to the color inks used as the process colors for printer 30. This 3D LUT is preferably provided using the ICC profile format defined by the International Color Consortium. The 3D LUT profile values can be parameters stored in fixed parameter table 48 in printer 30 for all printers of a given model, or alternately in variable parameter table 46 for a particular printer, which is measured for each batch of printers as they are manufactured. The ICC profile is provided from printer 30 to digital camera 10 by means of camera and printer interfaces 24 and 32 respectively, when printer 30 is connected to camera 10. The camera stores the ICC profile values in camera parameter memory 22.

If printer 30 is an ink jet printer using more than four color inks, the CMYK color planes are further processed in block 615 to provide color planes corresponding to each ink. This processing preferably uses ink rendering processing to convert a single color plane (e.g. the cyan channel C) into two color planes (e.g. light cyan Cl and dark cyan Cd). Therefore, the output of color correction block 615 is set of color planes corresponding to the color inks used in the inkjet printer, which may for example use light cyan, dark cyan, light magenta, dark magenta, yellow, and black color inks as the process colors.

In block 620, the color records are calibrated in order to correct for variations in tone scale. These variations may be may be the result of manufacturing variations in printer 10 or media (e.g. ink jet head or paper receiver) used by the printer. The calibration is provided by a one-dimensional lookup table applied to each color plane. The lookup table can be provided by parameters stored in variable parameter table 46 for a particular printer, which is measured for printer 30 as it is manufactured. Alternatively, the lookup table can be created by image processor 18 in digital camera 10 using parameters or settings provided by printer 30. The parameters or settings can include, for example, data indicating the type of media (e.g. ink jet head or paper receiver) used by the printer, or data such as the ink viscosity, humidity, etc. The lookup tables, parameters, or settings are provided from printer 30 to digital camera 10 by means of camera and printer interfaces 24 and 32 respectively, when printer 30 is connected to camera 10. The camera stores this data in camera parameter memory 22.

In block 625, the calibrated color planes corresponding to the inks of the ink jet printer are processed to provide ink limiting. This processing reduces the amount of ink that is deposited on the receiver media in high ink laydown areas. This is required in order to minimize deglossing and ink bleeding problems that reduce the image quality. It also reduces the stickiness, long drying time and delamination problems caused by laying down too much ink. The ink limiting step typically limits the total ink provided by all ink color planes to a maximum of 2 to 3 times the maximum amount of ink provided by a single color plane. The exact limit depends on the combination of the printer, ink, receiver media, and, to some extent, the humidity. To determine the appropriate limit to make a print, the type of printer, ink, and receiver media can be communicated from printer 30 to digital camera 10. In some embodiments, a humidity sensor in printer 30 can be used to sense the approximate humidity. A corresponding humidity parameter can be communicated, along with the type of printer, ink, and receiver media, from printer 30 to digital camera 10 by means of camera and printer interfaces 24 and 32 respectively, when printer 30 is connected to camera 10. The camera stores this data in camera parameter memory 22.

In block 630, the color records corresponding to the process colors of the ink jet printer are resized and rotated if necessary. This converts the pixels captured by the digital camera (e.g. the 1536 columns×1024 rows) to the appropriate number of pixels required by printer 30 in order to produce a selected image size. To perform this conversion, the number of pixels per inch used by printer 30 is communicated to digital camera 10, when printer 30 is connected to camera 10. The camera stores this data in camera parameter memory 22.

In block 635, the color records are converted to multi-tone values. Multi-toning is the process of reducing the bit depth of the image in a manner that reduces the spatial resolution while increasing the density resolution. Multi-toning is required in ink jet printers because the ink jet printers have few density levels (e.g. two density levels corresponding to ink or no ink, or four density levels corresponding to various ink drop sizes). Multi-toning using two density levels is also known as half-toning. Multi-toning may be provided using a variety of algorithms, such as the well-known "error diffusion" and "blue noise dithering" algorithms. In order for image processor 18 in digital camera 10 to provide multi-toning appropriate for printer 30, the number of density levels, and the density of each level, is provided by printer 30. More specifically, the density levels for each multi-tone level are stored in fixed parameter table 48 in printer 30 for all printers of a given model. The density levels are provided from printer 30 to digital camera 10 by means of camera and printer interfaces 24 and 32 respectively, when printer 30 is connected to camera 10. The camera stores the density levels in camera parameter memory 22.

In step 650, the multi-tone color records corresponding to the inks used in printer 30 are communicated from digital camera 10 to printer 30 by means of camera and printer interfaces 24 and 32 respectively. Printer 30 produces an ink jet print using the multi-tone color records by controlling the marking apparatus 42 and media transport mechanism 36 using simple processor 34.

In an alternative embodiment, some or all of the printer parameters are provided on a removable media, such as a floppy disk (not shown) or removable flash memory card 330, rather than being stored in fixed parameter table 48 or variable parameter table 46. The removable media is provided along with printer 30, and is inserted into digital camera 10 so that the parameters can be downloaded and stored in parameter memory 22. In the case of a floppy disk, the disk may be inserted into a separate host computer (not shown) and downloaded to the camera using a computer interface. The computer interface can use the same type of connection (e.g. USB, RS-232, IEEE 1394) as printer interface 24. Alternatively, the parameters may be included as part of a printer driver which performs all of the processing described in relation to FIG. 6. In this case, the printer driver firmware is downloaded from the removable media (supplied along with printer 30) and stored in the program memory 16 of digital camera 10.

In another alternative embodiment, some or all of the printer parameters, such as an ICC profile appropriate for particular "printer consumables" sold as a package, are provided as part of the printer consumables package. The printer consumables package can include, for example, printer receiver media (e.g. a quantity of photo grade ink jet paper) and a replacement color ink jet head for a particular type of printer. This printer consumables package can be provided with a nonvolatile digital memory, such as an EPROM, provided as part of the replacement color ink jet head. The parameters, such as the ICC profile, can be read from the EPROM memory by the simple processor 34 via the interface to the marking apparatus 42 when the color ink jet head is inserted into the printer 30, and transferred to the digital camera 10 via the interface 32.

The invention has been described in detail with particular reference to preferred embodiments thereof, but it will be understood that variations and modifications can be effected within the spirit and scope of the invention.

The invention claimed is:

1. A digital imaging system including a digital camera and a color printer, said system comprising the digital camera comprising:
    a housing;
    an image sensor adapted to capture analog image data;
    an analog-to-digital converter adapted to convert the analog image data captured by the image sensor to digital image data;
    an image processor adapted to perform first processing and compression of the digital image data to create a first-processed digital image file;
    digital memory in the camera housing, a plurality of first-processed digital image files from the image processor being stored in the digital memory; and
    a color printer interface to which a digital image file, which is selected from the digital memory, is applied; and the color printer comprising:
    a color marking apparatus, and a digital camera interface, wherein the image processor in the digital camera is adapted to perform second processing on the selected digital image file before the selected digital image file is applied to the color printer interface.

2. A digital imaging system as set forth in claim 1, wherein the color marking apparatus uses multi-tone values, and wherein color records of the selected digital image file are converted to multi-tone values during said second processing.

3. A digital imaging system as set forth in claim 2, wherein the multi-tone values are determined using a predetermined number of density levels provided by the digital camera interface of the color printer.

4. A digital imaging system as set forth in claim 3, wherein the multi-tone values are determined using a predetermined density for each of the density levels.

5. A digital imaging system a as set forth in claim 1, wherein color records of the selected digital image file are processed during said second processing to provide ink limiting.

6. A digital imaging system as set forth in claim 5, wherein the ink limiting is effected using type of printer, ink, and receiver media information provided by the separate color printer over the interface.

7. A method for operating a digital imaging system comprising:
    a digital camera and a color printer, the digital camera having an interface by which digital image data can be sent to the color printer, the method comprising the steps of:
    obtaining digital images data;
    processing the digital image data using a first processing method;
    storing the first processed digital image;
    determining when a stored digital image is selected for transfer to the color printer for printing; and
    performing second processing of the stored digital image data before transferring the stored digital image data to the color printer, said second processing adapting the stored digital image data into a form that compensates for printing variations, wherein said printing variations include parameters which vary with the type of media on which printing is performed.

8. The method of claim 7, wherein said printing variations comprise variations in printing caused by variations in manufacture of the printer.

9. The method of claim 7, wherein said second processing includes at least one of image sensor tone scale compensation, color filter array interpolation, decompression, color space transformation, re-sizing, rotation, cropping, spatial filtering, and compensation for the printing process.

* * * * *